United States Patent
Garg et al.

(10) Patent No.: US 10,855,166 B2
(45) Date of Patent: Dec. 1, 2020

(54) RIPPLE SHAPING FOR SWITCH-MODE POWER SUPPLY USING NUMBER OF ACTIVE PHASES

(71) Applicant: Infineon Technologies AG, Neubiberg (DE)

(72) Inventors: Pawan Garg, Munich (DE); Stefan Schumi, Taufkirchen (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/299,093

(22) Filed: Mar. 11, 2019

(65) Prior Publication Data

US 2020/0295651 A1    Sep. 17, 2020

(51) Int. Cl.
*H02M 1/15* (2006.01)
*H02M 3/158* (2006.01)
*H02M 1/00* (2006.01)
*H02M 3/156* (2006.01)

(52) U.S. Cl.
CPC .......... *H02M 1/15* (2013.01); *H02M 3/1584* (2013.01); *H02M 3/156* (2013.01); *H02M 2001/0009* (2013.01); *H02M 2001/0019* (2013.01); *H02M 2003/1586* (2013.01)

(58) Field of Classification Search
CPC . H02M 2001/0009; H02M 2001/0019; H02M 1/15; H02M 3/156; H02M 2003/1566; H02M 3/1584; H02M 2003/1586
See application file for complete search history.

(56) References Cited

U.S. PATENT DOCUMENTS

| | | | |
|---|---|---|---|
| 5,309,344 A | 5/1994 | Smith | |
| 5,929,692 A | 7/1999 | Carsten | |
| 9,627,976 B2* | 4/2017 | Li | H02M 3/1584 |
| 9,742,336 B2 | 8/2017 | Jeon et al. | |
| 10,298,114 B1* | 5/2019 | Yazdi | H02M 3/158 |
| 10,541,598 B1* | 1/2020 | Rozman | H02P 9/00 |
| 2003/0021132 A1 | 1/2003 | Frus et al. | |
| 2012/0217943 A1 | 8/2012 | Haddad | |
| 2012/0319478 A1 | 12/2012 | Gentchev et al. | |
| 2013/0141072 A1* | 6/2013 | Khlat | H02M 3/155 323/304 |
| 2014/0077787 A1 | 3/2014 | Gorisse et al. | |
| 2014/0271272 A1 | 9/2014 | Jeon et al. | |
| 2015/0028832 A1 | 1/2015 | Tournatory et al. | |

(Continued)

FOREIGN PATENT DOCUMENTS

| | | |
|---|---|---|
| EP | 2270964 A1 | 1/2011 |
| WO | 2017045075 A1 | 3/2017 |

*Primary Examiner* — Kyle J Moody
*Assistant Examiner* — Lakaisha Jackson
(74) *Attorney, Agent, or Firm* — Shumaker & Sieffert, P.A.

(57) ABSTRACT

A controller circuit for a switch-mode power supply (SMPS). The controller circuit is configured to generate, with a plurality of phases, a combined output current at a supply node to supply a load, determine a ripple shaping current complimentary to an estimated ripple at the combined output current using a number of active phases of the plurality of phases that generate the combined output current, and generate, with an auxiliary phase, the ripple shaping current at the supply node to reduce ripple occurring at the combined output current.

11 Claims, 12 Drawing Sheets

(56) References Cited

U.S. PATENT DOCUMENTS

| | | |
|---|---|---|
| 2015/0280564 A1 | 10/2015 | Siehl et al. |
| 2015/0381026 A1 | 12/2015 | Tournatory |
| 2017/0079095 A1 | 3/2017 | Fang et al. |
| 2017/0207723 A1 | 7/2017 | Zhang et al. |

\* cited by examiner

RIPPLE SHAPING FOR SWITCH-MODE POWER SUPPLY USING NUMBER OF ACTIVE PHASES

TECHNICAL FIELD

This disclosure relates a switching-mode power supply (SMPS), such as, for example, a multi-phase buck converter, multi-phase boost converter, or multi-phase buck-boost converter.

BACKGROUND

A duty cycle of a switching-mode power supply (SMPS) may be controlled to regulate a voltage, current, or power supplied to a load. A multi-phase SMPS includes paralleled power trains that are out of phase with each other to reduce a ripple of the current supplied to a load. A switching frequency of the multi-phase SMPS can be increased to further reduce the ripple of the current supplied to a load or decreased to permit cheaper and lower performance power semiconductors to be used for switching the paralleled power trains.

SUMMARY

In general, this disclosure is directed to techniques for reducing a ripple of the voltage, current, or power supplied by a switching-mode power supply (SMPS) to a load. For example, a controller circuit may determine a ripple shaping current complimentary to an estimated ripple at a combined output current and generate the ripple shaping current to reduce ripple occurring at the combined output current. In this way, the controller circuit may reduce a ripple of the voltage, current, or power supplied by the SMPS to a load while operating at a switching frequency that permits the SMPS to use cheaper and/or lower performance power semiconductors for generating the combined output current to supply the load.

In an example, a controller circuit for a SMPS, the controller circuit being configured to generate, with a plurality of phases, a combined output current at a supply node to supply a load, determine a ripple shaping current complimentary to an estimated ripple at the combined output current using a number of active phases of the plurality of phases that generate the combined output current, and generate, with an auxiliary phase, the ripple shaping current at the supply node to reduce ripple occurring at the combined output current.

In another example, a method for controlling a SMPS includes generating, by controller circuitry, with a plurality of phases, a combined output current at a supply node to supply a load, determining, by the controller circuitry, a ripple shaping current complimentary to an estimated ripple at the combined output current using a number of active phases of the plurality of phases that generate the combined output current, and generating, by the controller circuitry, with an auxiliary phase, the ripple shaping current at the supply node to reduce ripple occurring at the combined output current.

In another example, a SMPS system includes a plurality of phases configured to supply a load, a supply node, a capacitor coupled to the supply node, an auxiliary phase configured to reduce ripple occurring at the combined output current, and a controller circuit. The controller circuit is configured to generate, with the plurality of phases, a combined output current at the supply node to supply the load, determine a ripple shaping current complimentary to an estimated ripple at the combined output current using a number of active phases of the plurality of phases that generate the combined output current, and generate, with the auxiliary phase, the ripple shaping current at the supply node to reduce ripple occurring at the combined output current.

Details of these and other examples are set forth in the accompanying drawings and the description below. Other features, objects, and advantages will be apparent from the description and drawings, and from the claims.

DETAILED DESCRIPTION

Figure 1:
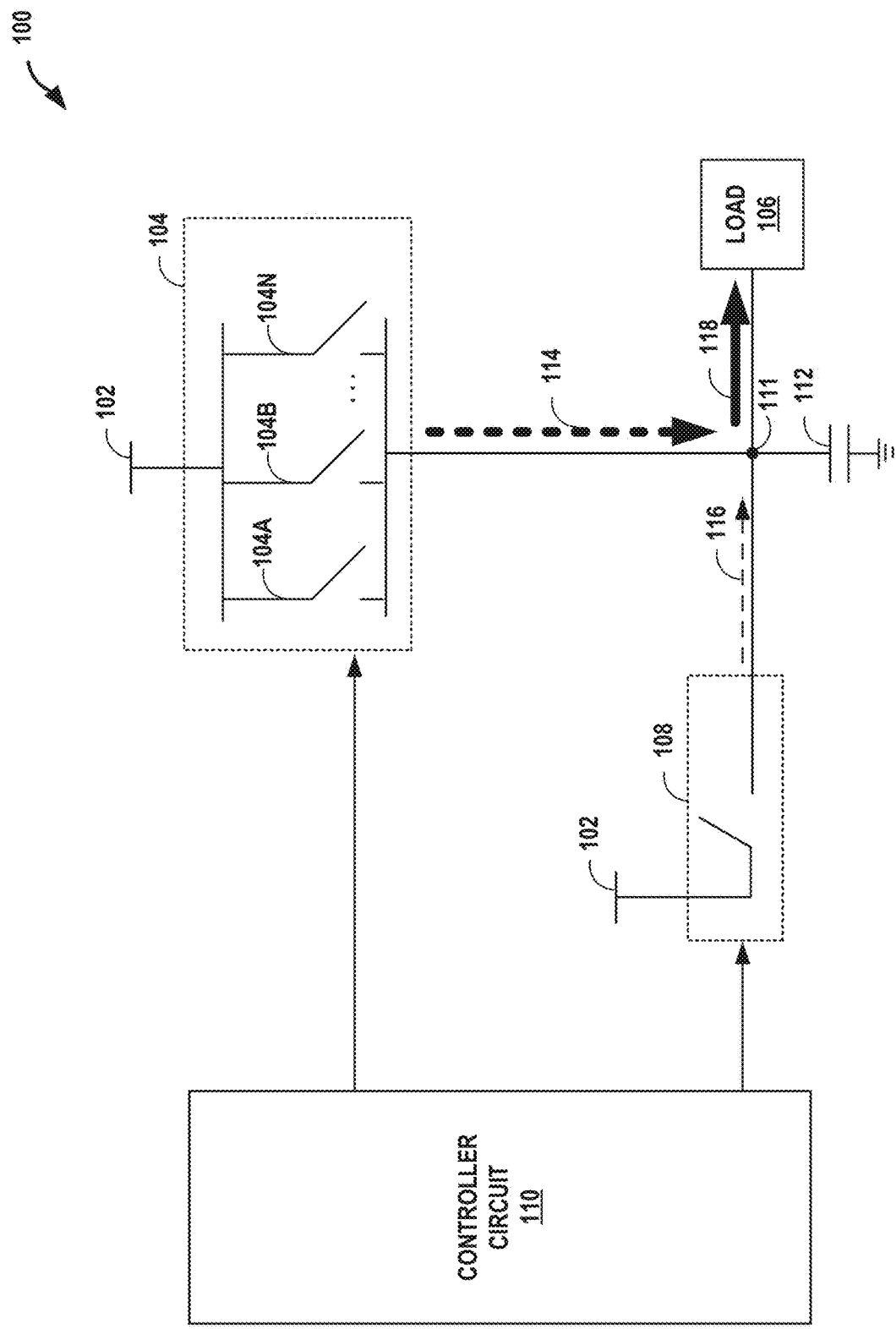
FIG. 1 is a block diagram illustrating an example system, in accordance with one or more techniques of this disclosure.

This disclosure is directed to techniques for reducing a ripple (e.g., an overshoot and/or undershoot) of a voltage, current, or power supplied by a switching-mode power supply (SMPS) to a load. Current ripple is an important factor in selecting and/or designing capacitors in DC-DC applications. Techniques of this disclosure may reduce the output current ripple in a DC-DC converter to reduce the passive requirements, relax operating switching frequency, and/or relax power semiconductor requirements, which may result in simplified control techniques and controller requirements.

In some applications, there are conflicting trends in multi-phase DC-DC converter design that rely on both a higher system efficiency and increasing switching frequency to reduce size. For example, configuring a SMPS with higher switching frequencies may increase switching losses of the SMPS, thereby reducing system efficiency for the SMPS. In this example, configuring the SMPS with lower switching frequencies may increase a size of the SMPS. Moreover, some SMPS designs may rely on expensive and/or high-performance semiconductor solutions (e.g., GaN/SiC, etc.). Such systems rely on increasing frequencies of the output current and/or voltage frequency spectrum to cancel low order switching harmonics.

In an example case of a multi-phase buck configured to cancel low order switching harmonics, the lowest order harmonic may be set to the switching frequency times the number of phases (e.g., (fsw)*(no. of phases)). In such systems, each phase operates at a switching frequency (fsw) that corresponds to a frequency of a ripple divided by a number of phases (e.g., fsw=fripple/n). In such systems, each phase may be used for power transfer and current sharing and control may be complex due to high number of phases. Moreover, such systems may use fast computational power in the microcontroller used for control. Further, such systems may rely on a high switching frequency and efficiency requirements that use high performance power semiconductors.

In accordance with one or more techniques described herein, systems may be configured to generate the ripple shaping current to reduce ripple occurring at the combined output current. Systems using ripple shaping current may include power transfer phases and ripple shaping phase(s). In this way, power transfer phases of systems using ripple shaping current may operate at a switching frequency (fsw) much less than a frequency of the ripple (e.g., fsw<<fripple) and hence may use a low-end microcontroller to control power transfer phases. Further, systems using ripple shaping current may use cheaper and lower performance (e.g., switching or conduction) power semiconductors for the power transfer phases compared to systems that omit using ripple shaping current. Systems using ripple shaping current may use low current rating power devices for implementing ripple shaping phase(s) that carry only AC current. Moreover, a frequency spectrum of the output current can be pushed to a frequency much higher than the switching frequency of power transfer phases, which may permit simplified filtering. A control of ripple shaping phase(s) may be extremely simple (e.g., a bang-bang control). Systems using ripple shaping current may comprise improved system optimization with multi-semiconductor solutions and/or asymmetric DC-DC system design compared to systems that omit ripple shaping current.

Moreover, techniques described herein may permit a controller circuit configured to estimate output ripple current to be easily controlled relative to systems that do not estimate output ripple current because the ripple may depend only on the gate signals of the active power transfer section. Switching elements of an SMPS for generating ripple shaping current may operate at a higher frequency than switching elements of an SMPS for generating output current, which may reduce losses and permit smaller passive components (e.g., capacitor, inductor, etc.) compared to systems that do not generate ripple shaping current. Moreover, a controller circuit configured to estimate output ripple current may rely on the same sensing or computational components as systems that do not estimate output ripple current. Switching elements of an SMPS for generating output current that are supported by ripple shaping current may operate at a lower frequency compared to switching elements of systems that do not estimate output ripple current, which may simplify the control and hence lower end microcontroller may used in the same application. While techniques are described as being applied to a multi-phase DC-DC converter, similar techniques may be applied to other SMPS converters, such as, for example, but not limited to, isolated DC-DC converters.

FIG. 1 is a block diagram illustrating an example system, in accordance with one or more techniques of this disclosure. As illustrated in the example of FIG. 1, system 100 may include source 102, phase 104A, phase 104B, . . . , phase 104N (collectively, phases 104"), load 106, auxiliary phase 108, controller circuit 110, supply node 111, and capacitor 112. As shown, capacitor 112 may be (directly) coupled to supply node 111. In some examples, capacitor 112 may represent an "output capacitor."

Source 102 may be configured to provide electrical power to one or more other components of system 100. For instance, source 102 may be configured to supply power to load 106. In some examples, source 102 includes a battery which may be configured to store electrical energy. Examples of batteries may include, but are not limited to, nickel-cadmium, lead-acid, nickel-metal hydride, nickel-zinc, silver-oxide, lithium-ion, lithium polymer, any other type of rechargeable battery, or any combination of the same. In some examples, source 102 may include an output of a linear voltage regulator, a power converter, or a power inverter. For instance, source 102 may include an output of a DC to DC power converter, an AC to DC power converter, and the like. In some examples, source 102 may represent a connection to an electrical supply grid. In some examples, the input power signal provided by source 102 may be a DC input power signal. For instance, in some examples, source 102 may be configured to provide a DC input power signal in the range of ~5 $V_{DC}$ to ~40 $V_{DC}$.

Phases 104 may be configured to switch-in and switch-out to generate a combined output current 114 at supply node 111. Each phase of phases 104 may include a switching element. For example, a switching element of phase 104A may couple a positive node of source 102 and supply node 111 to permit power to flow from the positive node of source 102 through capacitor 112 to a negative node of source 102 and to permit power to flow from the positive node of source 102 through load 106 to a negative node of source 102. Examples of switching elements may include, but are not limited to, a silicon-controlled rectifier (SCR), a Field Effect Transistor (FET), and a bipolar junction transistor (BJT). Examples of FETs may include, but are not limited to, a junction field-effect transistor (JFET), a metal-oxide-semiconductor. FET (MOSFET), a dual-gate MOSFET, an insulated-gate bipolar transistor (IGBT), any other type of FET, or any combination of the same. Examples of MOSFETS may include, but are not limited to, a depletion mode p-channel MOSFET (PMOS), an enhancement mode PMOS, depletion mode n-channel MOSFET (NMOS), an enhancement mode NMOS, a double-diffused MOSFET (DMOS), any other type of MOSFET, or any combination of the same. Examples of BJTs may include, but are not limited to, PNP, NPN, heterojunction, or any other type of BJT, or any combination of the same. Switching elements may be high-side or low-side switching elements. Additionally, switching elements may be voltage-controlled and/or current-controlled. Examples of current-controlled switching elements may include, but are not limited to, gallium nitride (GaN) MOSFETs, BJTs, or other current-controlled elements.

Load 106 may include one or more of a resistive load, a capacitive load, or an inductive load. In some examples, load 106 may include a set of LEDs (e.g., one or more LEDs). As used herein, LEDs may refer to any suitable semiconductor light source. In some examples, an LEDs may include a p-n junction configured to emit light when activated. In an exemplary application, load 106 may include one or more LEDs implemented in a headlight assembly, a taillight assembly, or another assembly for automotive applications. As used herein, a vehicle may refer to trucks, boats, golf carts, snowmobiles, heavy machines, or any type of vehicle that uses directional lighting.

Auxiliary phase 108 may be configured to switch-in and switch-out to generate a ripple shaping current 116 at supply node 111. Auxiliary phase 108 may include a switching element. For example, a switching element of auxiliary phase 108 may couple a positive node of source 102 and supply node 111 to permit power to flow from the positive node of source 102 through capacitor 112 to a negative node of source 102 and to permit power to flow from the positive node of source 102 through load 106 to a negative node of source 102. While FIG. 1 illustrates a single auxiliary phase, in some examples, auxiliary phase 108 may include a plurality of phases that are switch-in and switch-out to generate a ripple shaping current 116 at supply node 111.

Controller circuit 110 may be configured to control phases 104 and auxiliary phase 108. In some examples, controller circuit 110 may be configured to control phases 104 to regulate current 118 supplied to load 106. For example, controller circuit 110 may switch-in and switch-out phases 104 using pulse width modulation where each phase is switched with a different phase difference relative other phases of phases 104. For instance, controller circuit 110 may, using pulse width modulation, switch-in and switch-out phase 104A with a 0-degree phase difference, phase 104 with a 120-degree phase difference, and phase 104N with a 240-degree phase difference. In some examples, controller circuit 110 may be configured to control phases 104 and auxiliary phase 108 to regulate a voltage or power supplied to load 106. Controller circuit 110 may be configured to control auxiliary phase 108 to help to minimize a ripple of current 118 supplied to load 106.

In some examples, controller circuit 110 may include an analog circuit. In some examples, controller circuit 110 may be a microcontroller on a single integrated circuit containing a processor core, memory, inputs, and outputs. For example, controller circuit 110 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, controller circuit 110 may be a combination of one or more analog components and one or more digital components.

Controller circuit 110 may switch phases 104 at a different e.g., higher, lower, etc.) frequency than auxiliary phase 108. For example, to generate combined output current 114, controller circuit 110 may be configured to generate combined output current 114 using a first switching frequency and to generate ripple shaping current 116 using a second switching frequency that is greater than the first switching frequency. For instance, controller circuit 110 may be configured to generate combined output current 114 of 120 amps per phase using a first switching frequency of less than 100 kHz (e.g., 10 kHz) and to generate ripple shaping current 116 of 20 amps using a second switching frequency of greater than 100 kHz (e.g., 500 kHz).

In accordance with one or more techniques, controller circuit 110 may be configured to generate, with phases 104, combined output current 114 at supply node 111 to supply load 106. Controller circuit 110 may determine ripple shaping current 116 complimentary to an estimated ripple at combined output current 114 using a number of active phases of phases 104 and generate, with auxiliary phase 108, ripple shaping current 116 at supply node 111 to reduce ripple occurring at combined output current 114.

Figure 2:
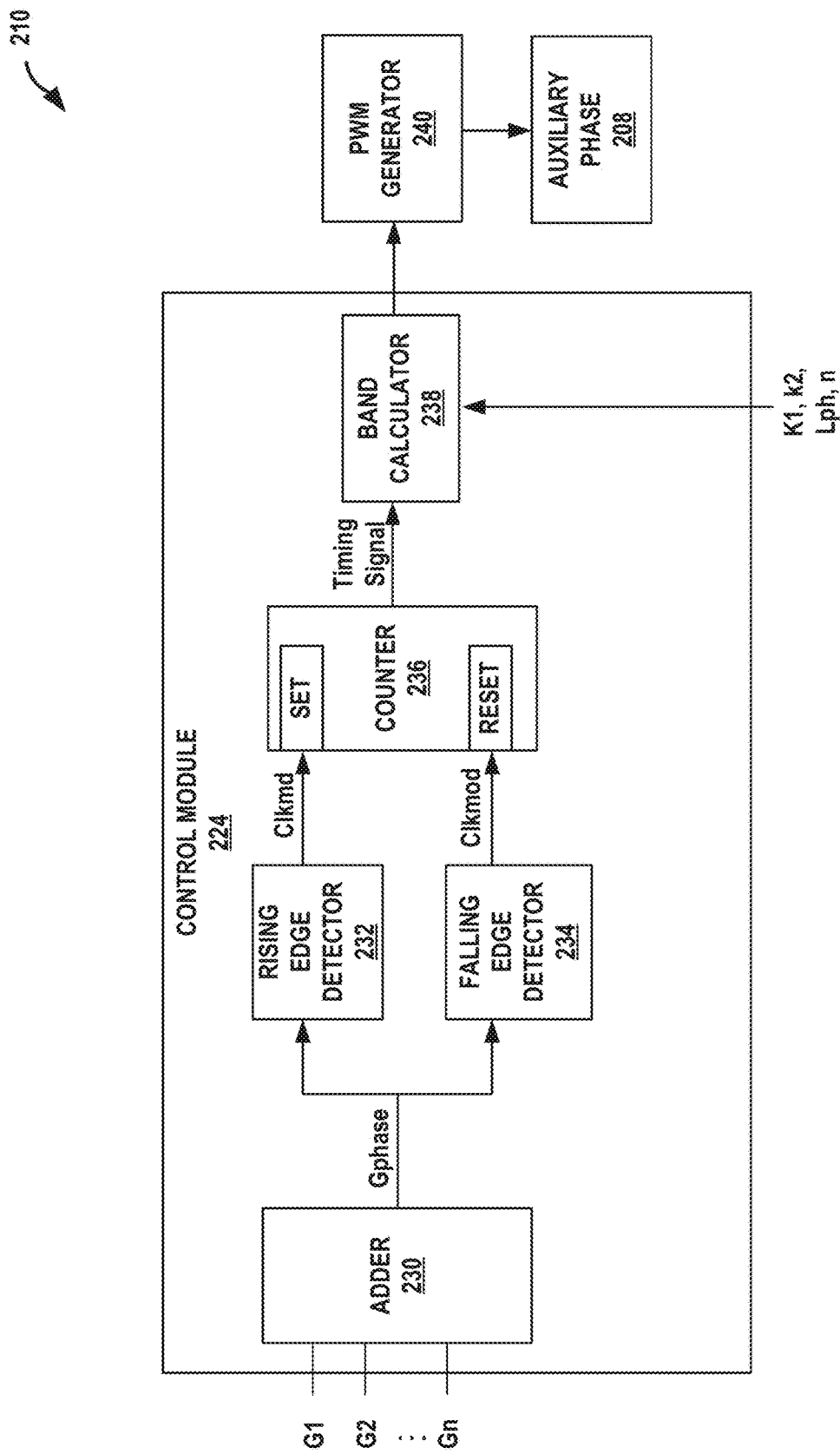
FIG. 2 is a conceptual diagram illustrating an example controller circuit, in accordance with one or more techniques of this disclosure.

FIG. 2 is a conceptual diagram illustrating an example controller circuit 210, in accordance with one or more techniques of this disclosure. FIG. 2 is discussed with reference to FIG. 1 for example purposes only. Controller circuit 210 may include control module 224, pulse-width modulation (PWM) generator 240, and auxiliary phase 208.

Controller circuit 210 may be configured to control (e.g., using a hang-bang or hysteretic control) additional DC-DC phase(s) to shape current ripple, to move the output current frequency spectrum to a higher frequency. Controller circuit 210 may shape the current ripple using system characteristics and an operating point. As used herein, operating point may refer to, for example, but not limited to, a switching frequency, an output inductor, a capacitor, or another operating point.

For example, controller circuit 210 may estimate the output ripple current by using a logic combination of the gate signals of different phases. As controller circuit 210 may be configured to determine system parameters (e.g., frequency, inductance, input voltage, and output voltage), controller circuit 210 may estimate the ripple current on an output capacitor (e.g., capacitor 112). Controller circuit 110 may include a "ripple shaping" block (RSB) that may act on the system parameters to reduce the output ripple. Control module 224 is an example of an RSB block that may act on the system parameters to reduce the output ripple.

To determine the ripple shaping current, control module 224 may be configured to determine a timing signal using a time period of a single phase of the plurality of phases, a maximum number of active phases of the plurality of phases, and a duty cycle. For example, controller circuit 210 may include adder 230, rising edge detector 232, falling edge detector 234, counter 236, and band calculator 238.

Adder 230 is configured to receive, for each respective phase of phases 104, a gate signal ($G_1$, $G_2$, ... $G_n$) for activating the respective phase to a respective input of a plurality of inputs of adder 230. Adder 230 is further configured to output an indication of the number of active phases ("Gphase").

Rising edge detector 232 is configured to generate a rising edge clock ("Clkmd") using the time period and the maximum number of active phases. Falling edge detector 234 is configured to generate a falling edge clock using the time period, the maximum number of active phases, and a duty cycle for the amount of active phases of phases 104.

Counter 236 is configured to generate a timing signal using the rising edge clock and the falling edge clock such that the timing signal indicates when the combined output current is rising and when the combined output current is falling. For example, counter 236 may be configured to receive, from rising edge detector 232, the rising edge clock at a set input of counter 236, receive, from falling edge detector 234, the falling edge clock at a reset input of counter 236 and output the timing signal.

Band Calculator 238 may generate a band (e.g., upper limit and lower limit) for controlling PWM generator 240. PWM generator 240 may be configured to switch-in and switch-out auxiliary phase 208 based on a comparison of a current at auxiliary phase 208 and the band. For example, PWM generator 240 may be configured to generate the ripple shaping current to be within the band of center values. For instance, PWM generator 240 may be configured to operate in a rising current state that increases the ripple shaping current or a falling current state that increases the ripple shaping current. PWM generator 240 may be configured to transition from the rising current state to the falling current state when a measurement of the ripple shaping current generated indicates the ripple shaping current is not less than the upper limit and transition from the falling current state to the rising current state when the measurement of the ripple shaping current generated indicates the ripple shaping current is not greater than the lower limit.

Figure 3:
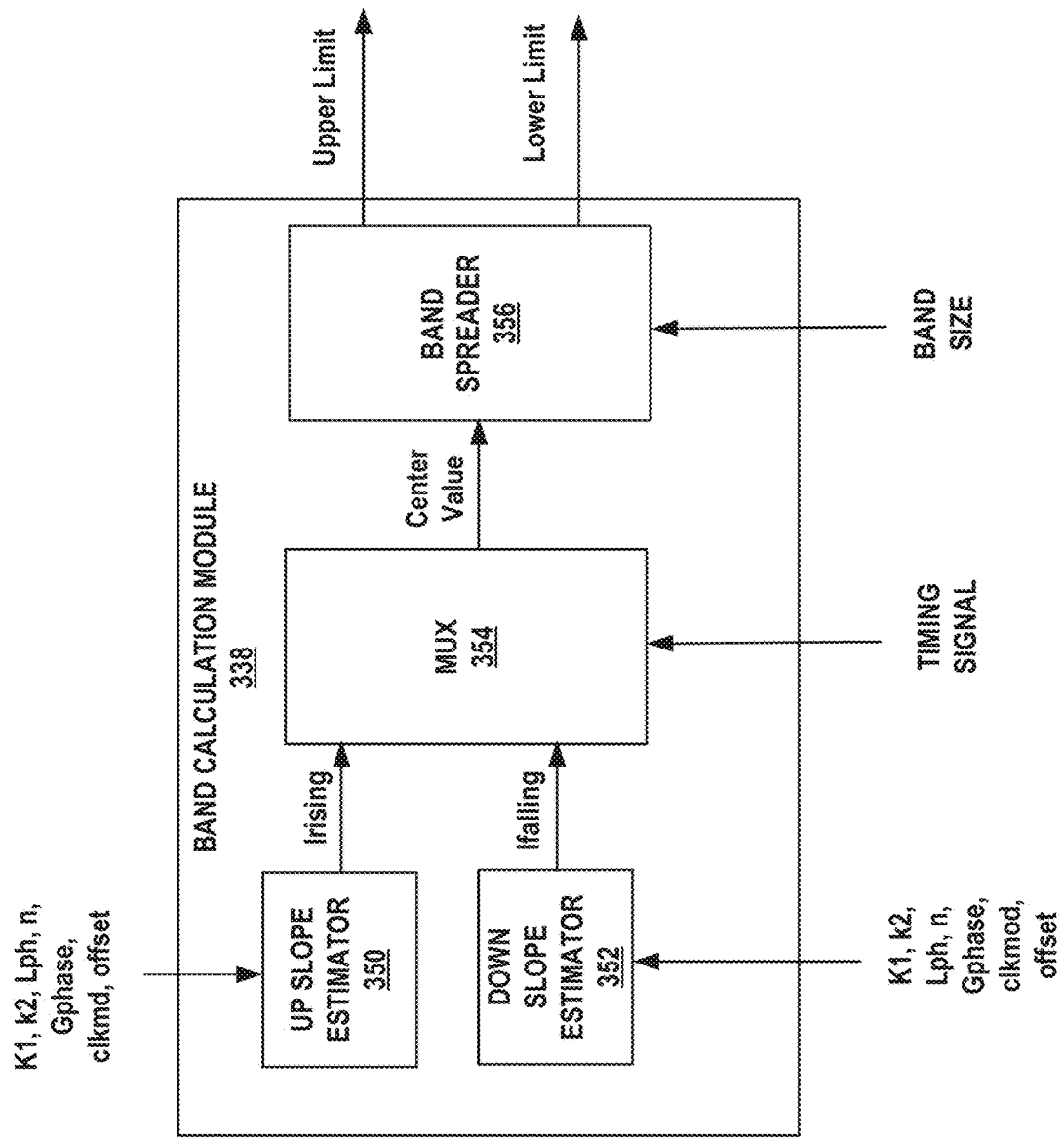
FIG. 3 is a conceptual diagram illustrating an example band calculation module, in accordance with one or more techniques of this disclosure.

FIG. 3 is a conceptual diagram illustrating an example band calculation module 338, in accordance with one or more techniques of this disclosure. FIG. 3 is discussed with reference to FIGS. 1-2 for example purposes only. Band calculation module 338 may be an example of band calculation module 238 of FIG. 2. Band calculation module 338 includes up slope estimator 350, down slope estimator 352, multiplexer 354 (MUX 354), and hand spreader 356. In some examples, band calculation module 334 is configured to generate a center value using the number of active phases ('n').

Timing signal generation is discussed in further detail as follows.

$$Clk_{md} = \text{time mod } T_{ph}/n$$

$$Clk_{mod} = clk_{md} - DC \cdot T_{ph}/n \quad \text{Equation 1}$$

Where $Clk_{mod}$ is the shifted clock cycle for the falling edge, $Clk_{md}$ is the clock cycle for the rising edge, DC is the adapted duty cycle for the amount of active phases, $T_{ph}$ is the time period of a single phase, n is the number of maximum active gates, and Gphase is the number of active gates.

Down slope estimator 350 is configured to output an indication of a falling slope current ($I_{falling}$). For example, when current 118 supplied to load 106 ("$I_{load}$") has a falling slope, down slope estimator 352 may calculate current on the falling edge ($I_{falling}$) as follows.

$$I_{falling} = \frac{k1}{Lph} * Gphase * clkmod + \\ \frac{k2}{Lph} * (n - Gphase) * clkmod + \text{offset} \quad \text{Equation 2}$$

Where k1 is a first system factor that depends on input-voltage ("Vin"), output voltage ("Vout"), and efficiency ("eff") of the DC-DC converter. For example, the first system factor may be equal to the input voltage times the efficiency minus the output voltage (e.g., k1=vin*eff−vout). Lph is the phase inductance, a second system factor ("k2") is the output voltage of the DC-DC converter. For example, the second system factor may depend on the output voltage and the offset may be calculated and/or predefined as a previously calculated value. The initial value may be zero due to no conduction.

For example, in response to determining a timing signal indicates the combined output current is falling, down slope estimator 352 may be configured to determine a first system factor (e.g., k1) by subtracting an output voltage of the SMPS by a result of multiplying an input voltage of the SMPS by an efficiency of the SMPS, determine a second system factor (e.g., k2) as the output voltage of the SMPS, divide a result of multiplying the first system factor by the number of active phases and a falling edge clock by the phase inductance to determine a first falling current factor $$\left(\text{e.g., } \frac{k1}{Lph} * Gphase * clkmod\right),$$

divide a result of multiplying the second system factor by the number of inactive phases and the rising edge clock by the phase inductance to determine a second falling current factor $$\left(\text{e.g., } \frac{k2}{Lph} * (n - Gphase) * clkmod\right),$$

and add the first falling current factor and the second falling current factor. In this example, down slope estimator 352 may be configured to determine the ripple shaping current using a phase inductance of the plurality of phases.

Up slope estimator 350 is configured to output an indication of a rising slope current ($I_{rising}$). For example, when $I_{Load}$ has a rising slope up slope estimator 350 may calculate current on the rising edge ($I_{rising}$) as follows.

$$I_{rising} = \frac{k1}{Lph} * Gphase * clkmd + \frac{k2}{Lph} * (n - Gphase) * clkmd \quad \text{Equation 3}$$

For example, in response to determining the timing signal indicates the combined output current is rising, up slope estimator 350 may determine a first system factor (k1) by subtracting an output voltage of the plurality of phases by a result of multiplying an input voltage of the plurality of phases by an efficiency of the plurality of phases, determine a second system factor (e.g., k2) as the output voltage of the plurality of phases, divide a result of multiplying the first system factor by the number of active phases and a rising edge clock by a phase inductance to determine a first rising current factor $$\left(\text{e.g., } \frac{k1}{Lph} * Gphase * clkmd\right),$$

divide a result of multiplying the second system factor by a number of inactive phases of the plurality of phases and the falling edge clock by the phase inductance to determine a second rising current factor $$\left(\text{e.g., } \frac{k2}{Lph} * (n - Gphase) * clkmd\right),$$

and add the first rising current factor and the second rising current factor. In this example, up slope estimator 350 may be configured to determine the ripple shaping current using a phase inductance of the plurality of phases.

MUX 354 is configured to select either the rising slope current or the falling slope based on the timing signal. For example, MUX 354 may be configured to select the center value as follows.

$$\text{Center value} = \begin{cases} I_{falling} \\ I_{rising} \end{cases} \quad \text{Equation 4}$$

depending on Gphase if current is rising or falling

Band spreader 356 is configured to generate a band of center values (e.g., upper limit and lower limit) using the center value. For example, band spreader 356 may be configured to calculate an upper limit and lower limit as follows.

$$\text{Upper Limit} = \text{Center value} + \frac{\text{Bandsize}}{2} \quad \text{Equation 5}$$

$$\text{Lower Limit} = \text{Center value} - \frac{\text{Bandsize}}{2} \quad \text{Equation 6}$$

For example, band spreader 356 may be configured to add a band size offset $$\left(\text{e.g., } B\frac{\text{Bandsize}}{2}\right)$$

to the center value to generate an upper limit and subtract the band size offset from the center value to generate a lower limit.

Figure 4:
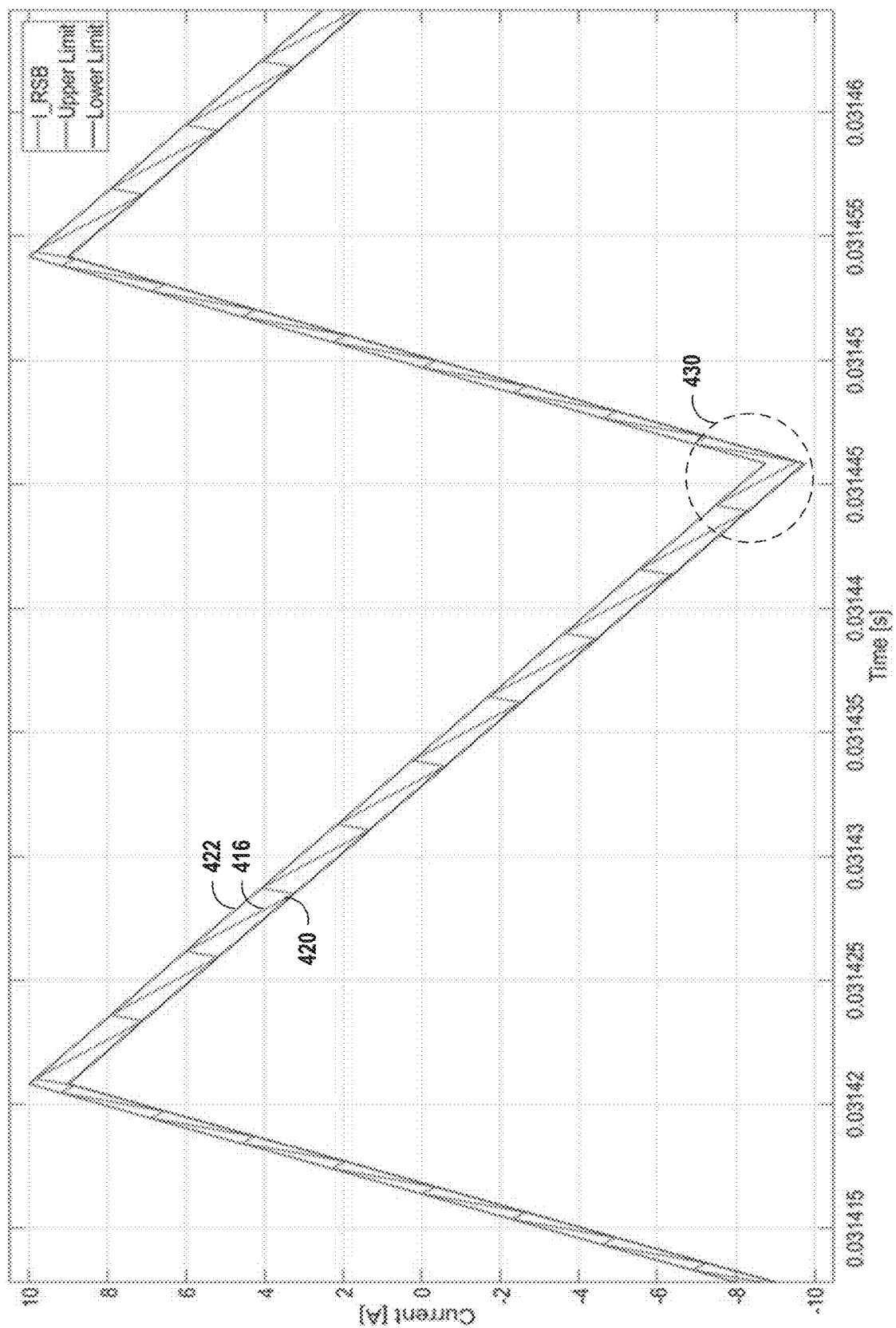
FIG. 4 is a diagram illustrating an example performance of the system of FIG. 1, in accordance with one or more techniques of this disclosure.

FIG. 4 is a diagram illustrating an example performance of the system of FIG. 1, in accordance with one or more techniques of this disclosure. FIG. 4 is discussed with reference to FIGS. 1-3 for example purposes only. The abscissa axis (e.g., horizontal) of FIG. 4 represents time and the ordinate axis (e.g., vertical) of FIG. 4 represents ripple shaping current 416, upper limit 420, and lower limit 422.

In the example of FIG. 4, band calculation module 338 generates upper limit 420 and lower limit 422. For example, MUX 354 selects $I_{falling}$, which is output by down slope estimator 352 before time 430 and selects $I_{rising}$, which is output by up slope estimator 352 after time 430. In this example, band spreader 356 generates upper limit 420 and lower limit 422 using a center value (not shown) output by MUX 354. In this example, PWM generator 240 switches auxiliary phase 208 using PWM to control ripple shaping current 416 to be within upper limit 420 and lower limit 422 (e.g., using bang-bang control).

Figure 5A:
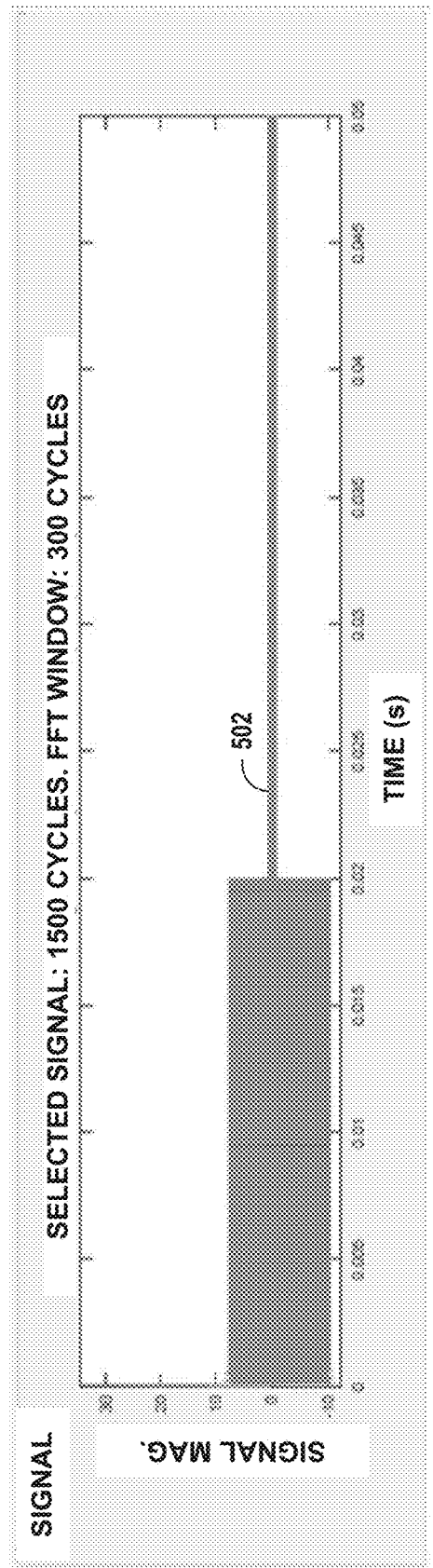
FIG. 5A is a diagram illustrating a first signal magnitude for system of FIG. 1, in accordance with one or more techniques of this disclosure.

FIG. 5A is a diagram illustrating a signal magnitude for system of FIG. 1, in accordance with one or more techniques of this disclosure. FIG. 5A is discussed with reference to FIGS. 1-4 for example purposes only. The abscissa axis (e.g., horizontal) of FIG. 5A represents time and the ordinate axis (e.g., vertical) of FIG. 5A represents signal magnitude 502 of combined output current 114.

Figure 5B:
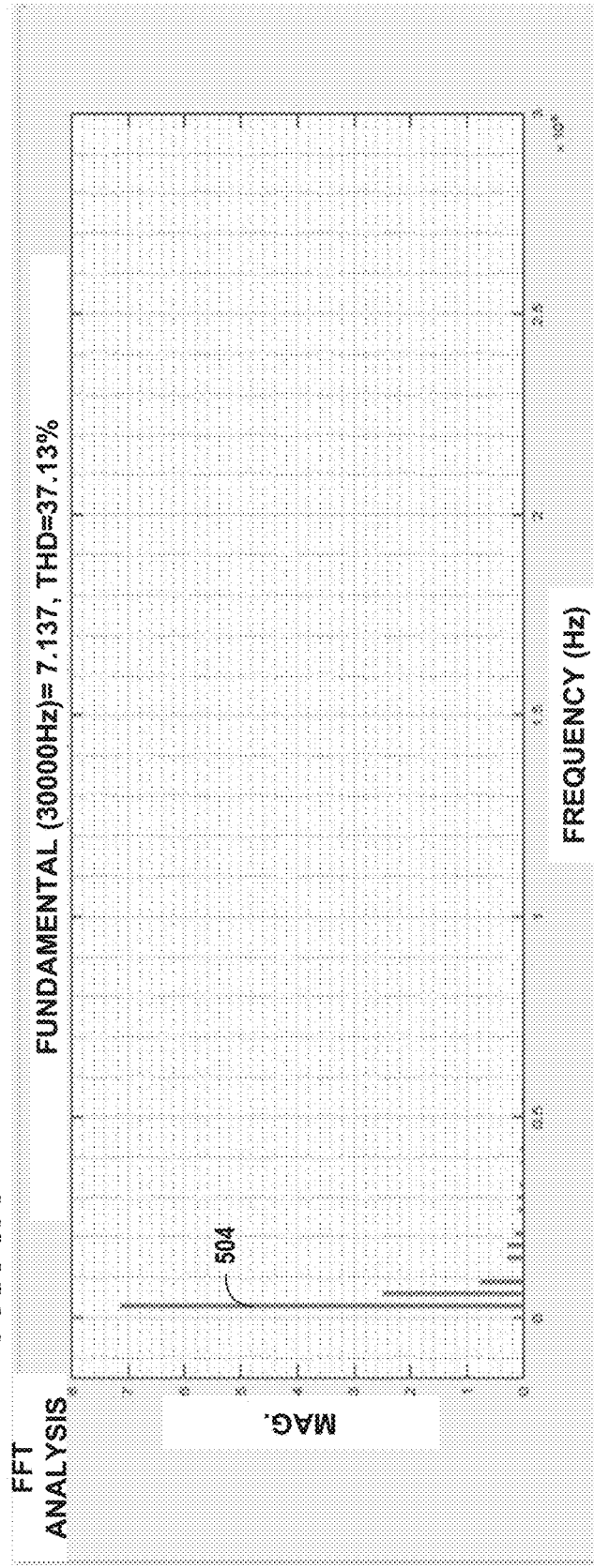
FIG. 5B is a diagram illustrating a Fourier transform of the signal magnitude of FIG. 5A, in accordance with one or more techniques of this disclosure.

FIG. 5B is a diagram illustrating a Fourier transform of the signal magnitude of FIG. 5A, in accordance with one or more techniques of this disclosure. FIG. 5B is discussed with reference to FIGS. 1-4 and 5A for example purposes only. The abscissa axis (e.g., horizontal) of FIG. 5B represents frequency and the ordinate axis (e.g., vertical) of FIG. 5B represents magnitude 504 for combined output current 114. As shown, magnitude 504 includes zero DC component and has a high content of low order harmonics (e.g., <100 kHz) with almost no high frequency content.

Figure 6A:
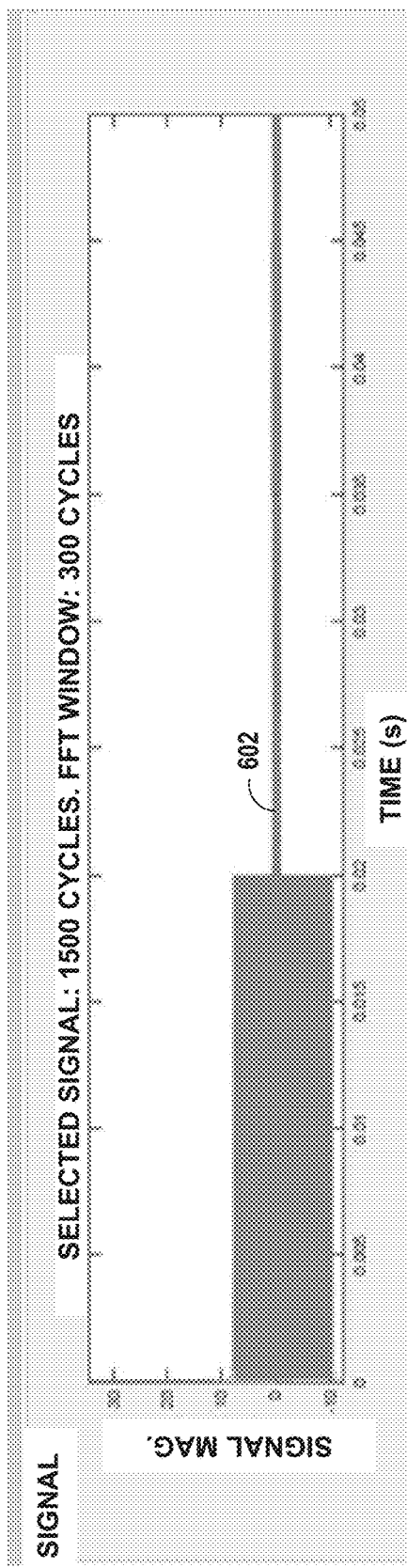
FIG. 6A is a diagram illustrating a second signal magnitude for system of FIG. 1, in accordance with one or more techniques of this disclosure.

FIG. 6A is a diagram illustrating a second signal magnitude for system of FIG. 1, in accordance with one or more techniques of this disclosure. FIG. 6A is discussed with reference to FIGS. 1-4 and 5A-5B for example purposes only. The abscissa axis horizontal) of FIG. 6A represents time and the ordinate axis (e.g., vertical) of FIG. 6A represents signal magnitude 602 of current 118 supplied to load 106, which includes ripple shaping current 116 and combined output current 114.

Figure 6B:
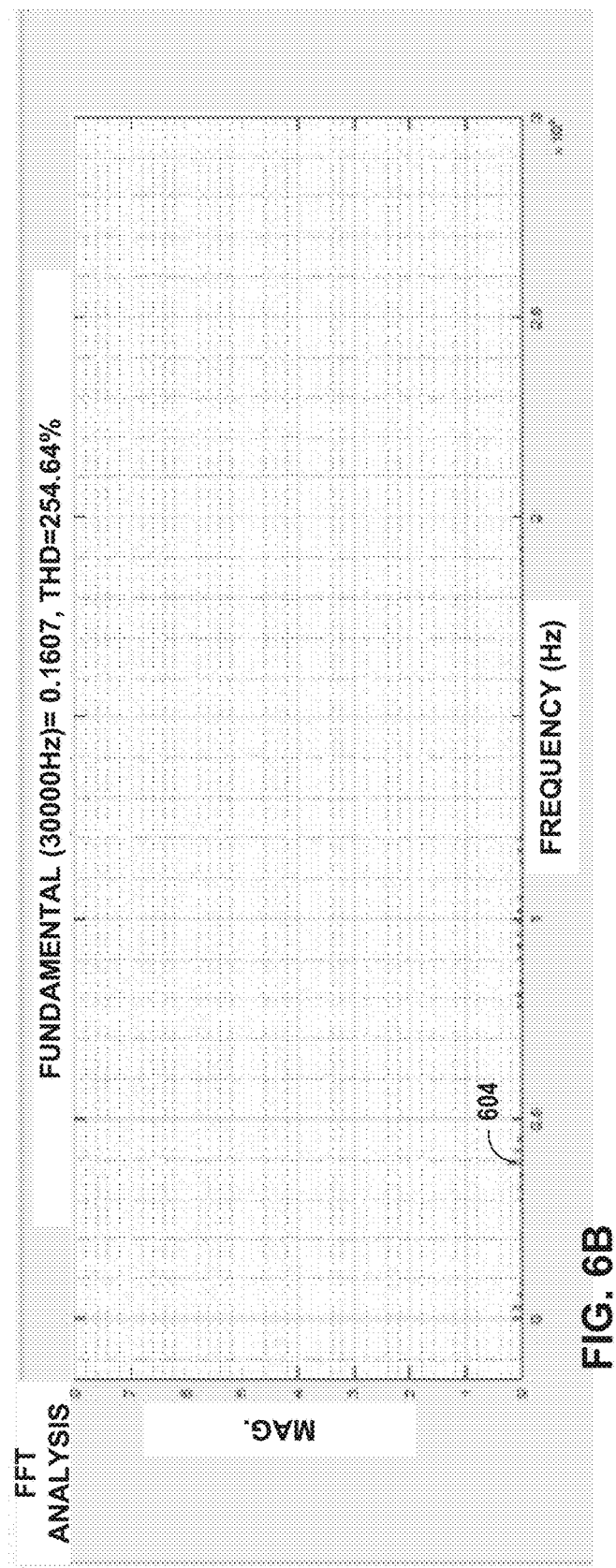
FIG. 6B is a diagram illustrating a Fourier transform of the signal magnitude of FIG. 6A, in accordance with one or more techniques of this disclosure.

FIG. 6B is a diagram illustrating a Fourier transform of the signal magnitude of FIG. 6A, in accordance with one or more techniques of this disclosure. FIG. 5B is discussed with reference to FIGS. 1-4, 5A-5B, and 6A for example purposes only. The abscissa axis (e.g., horizontal) of FIG. 6B represents frequency and the ordinate axis (e.g., vertical) of FIG. 6B represents magnitude 604 of current 118 supplied to load 106, which includes ripple shaping current 116 and combined output current 114. Magnitude 604 includes a low content of low order harmonics (e.g., <100 kHz) and larger high frequency content compared to magnitude 504 and includes a largest peak at 390 kHz.

Figure 7:
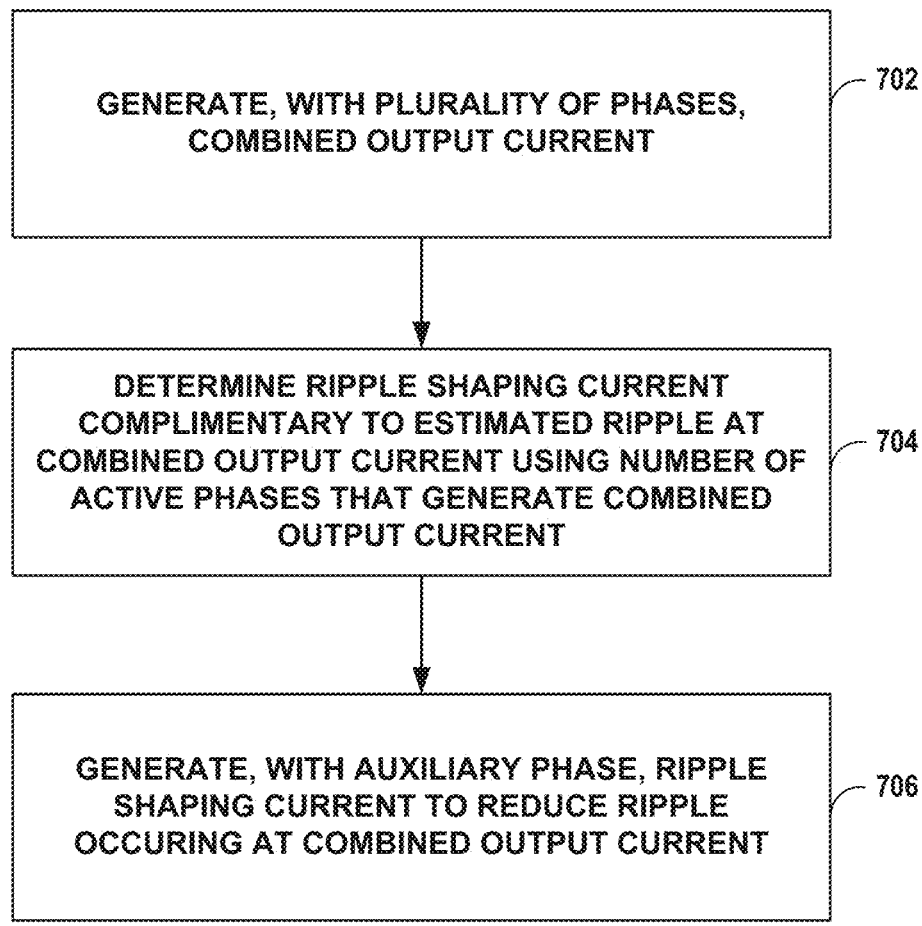
FIG. 7 is a first flow diagram consistent with techniques that may be performed by the example system of FIG. 1, in accordance with this disclosure.

FIG. 7 is a first flow diagram consistent with techniques that may be performed by the example system of FIG. 1, in accordance with this disclosure. FIG. 7 is discussed with reference to FIGS. 1-4, 5A-5B, and 6A-6B for example purposes only. Controller circuit 110 generates, with phases 104, combined output current (702). Controller circuit 110 determines ripple shaping current complimentary to estimate ripple at combined output current 114 using a number of active phases that generated the combined output current (704). Controller circuit 110 generates, with auxiliary phase 108, ripple shaping current 116 to reduce ripple occurring at combined output current 114 (706).

Figure 8:
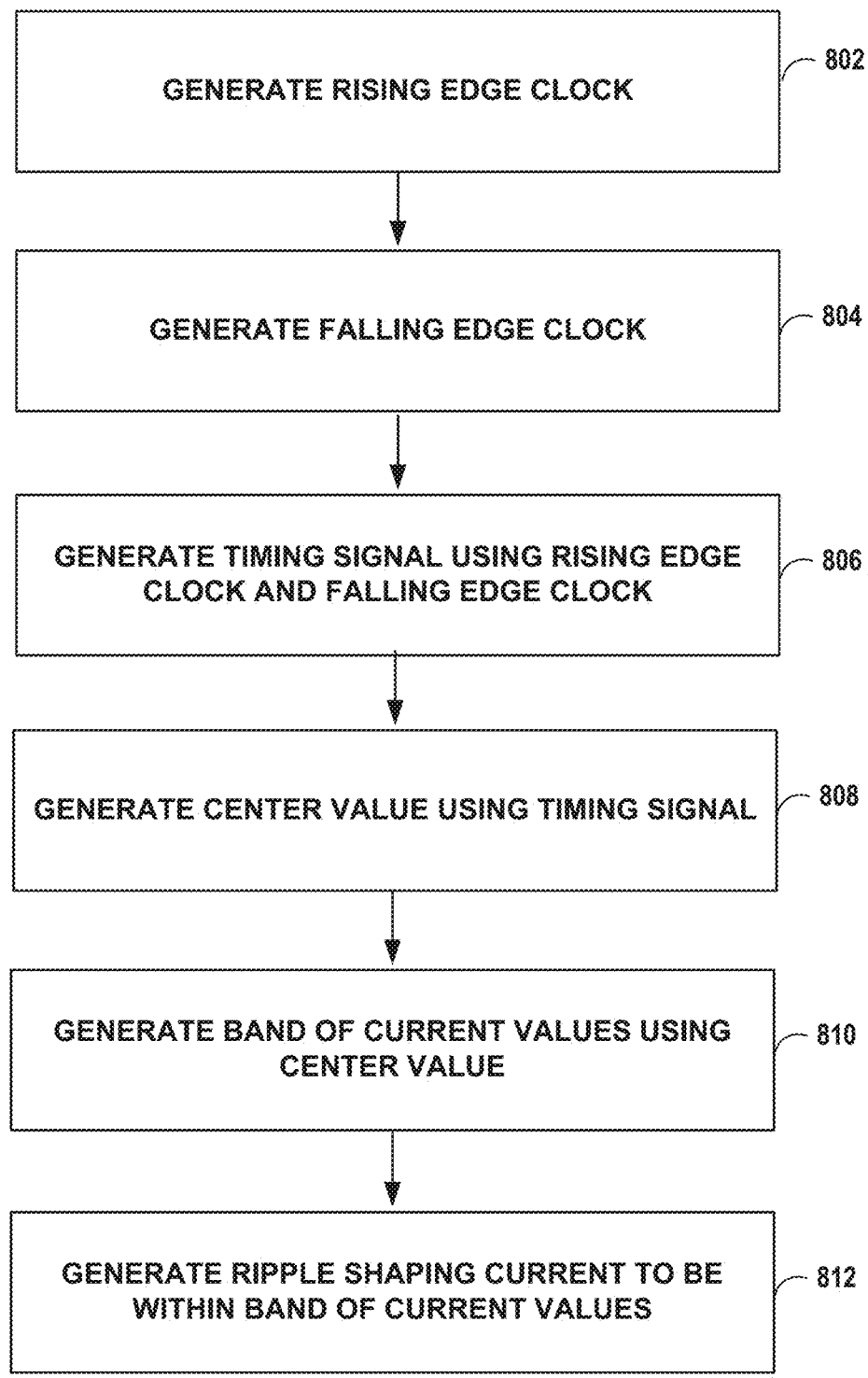
FIG. 8 is a second flow diagram consistent with techniques that may be performed by the example system of FIG. 1, in accordance with this disclosure.

FIG. 8 is a second flow diagram consistent with techniques that may be performed by the example system of FIG. 1, in accordance with this disclosure. FIG. 8 is discussed with reference to FIGS. 1-4, 5A-5B, 6A-6B, and 7 for example purposes only. Rising edge detector 232 generates a rising edge clock (802). Falling edge detector 234 generates a falling edge clock (804). Counter 236 generates a timing signal using the rising edge clock and the falling edge clock (806). MUX 354 with up slope estimator 350 and down slope estimator 352 generates a center value using the timing signal (808). Band spreader 356 generator 240 generates a band of current values using the center value (810). PWM generator 240 generates a ripple shaping current to be within the band of current values (812).

Figure 9:
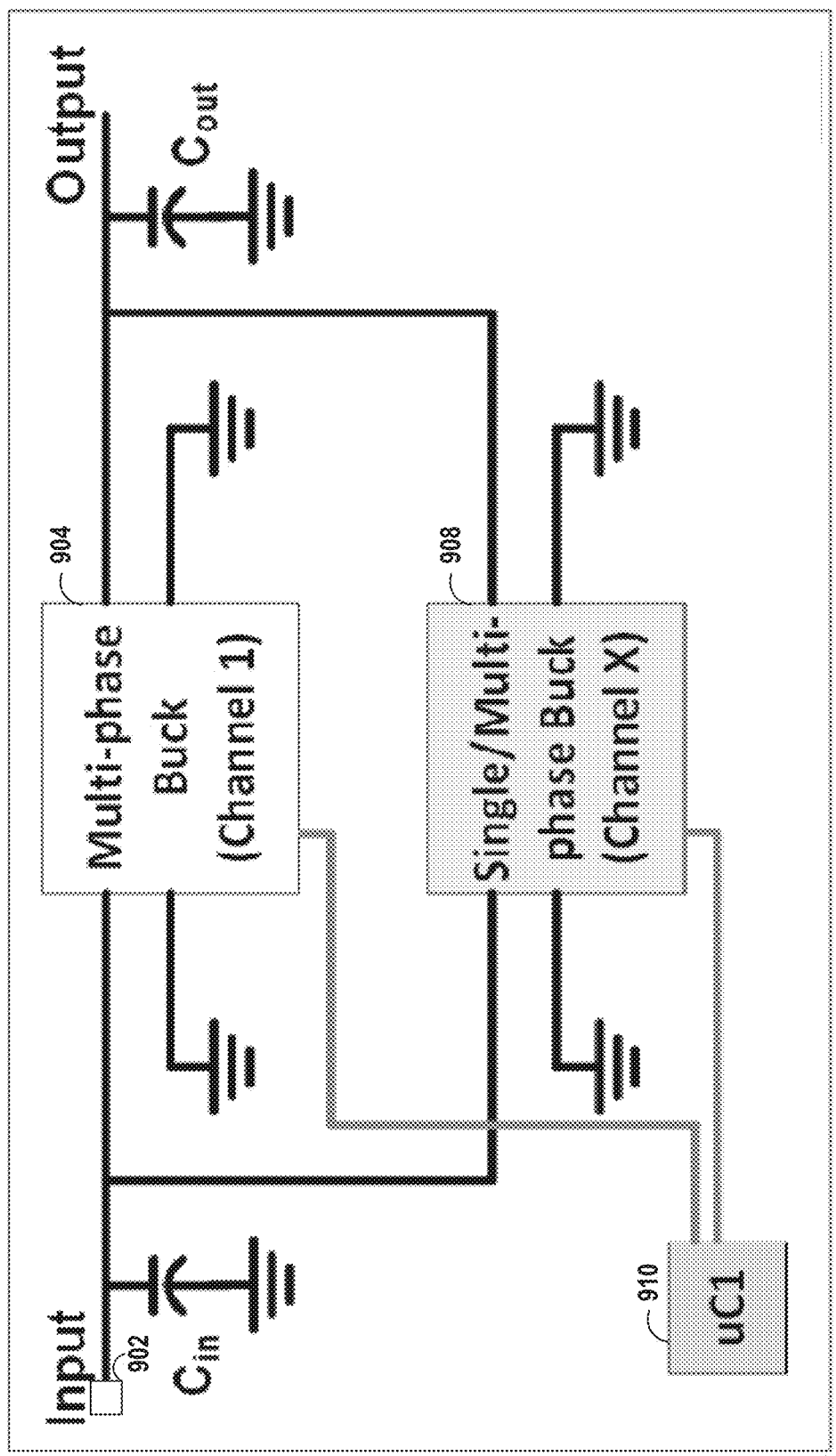
FIG. 9 is a conceptual diagram illustrating a first example switching-mode power supply (SMPS), in accordance with one or more techniques of this disclosure.

FIG. 9 is a conceptual diagram illustrating a first example switching-mode power supply (SMPS), in accordance with one or more techniques of this disclosure. FIG. 9 is discussed with reference to FIGS. 1-4, 5A-5B, 6A-6B, 7, and 8 for example purposes only. FIG. 9 includes source 902, phases 904, auxiliary phase 908, and microcontroller 910, which may be examples of source 102, phases 104, auxiliary phase 108, and controller circuit 110, respectively. In the example of FIG. 9, microcontroller 910 controls phases 904 and auxiliary phase 908. In this example, source 902 provides power to phases 904 and auxiliary phase 908.

Figure 10:
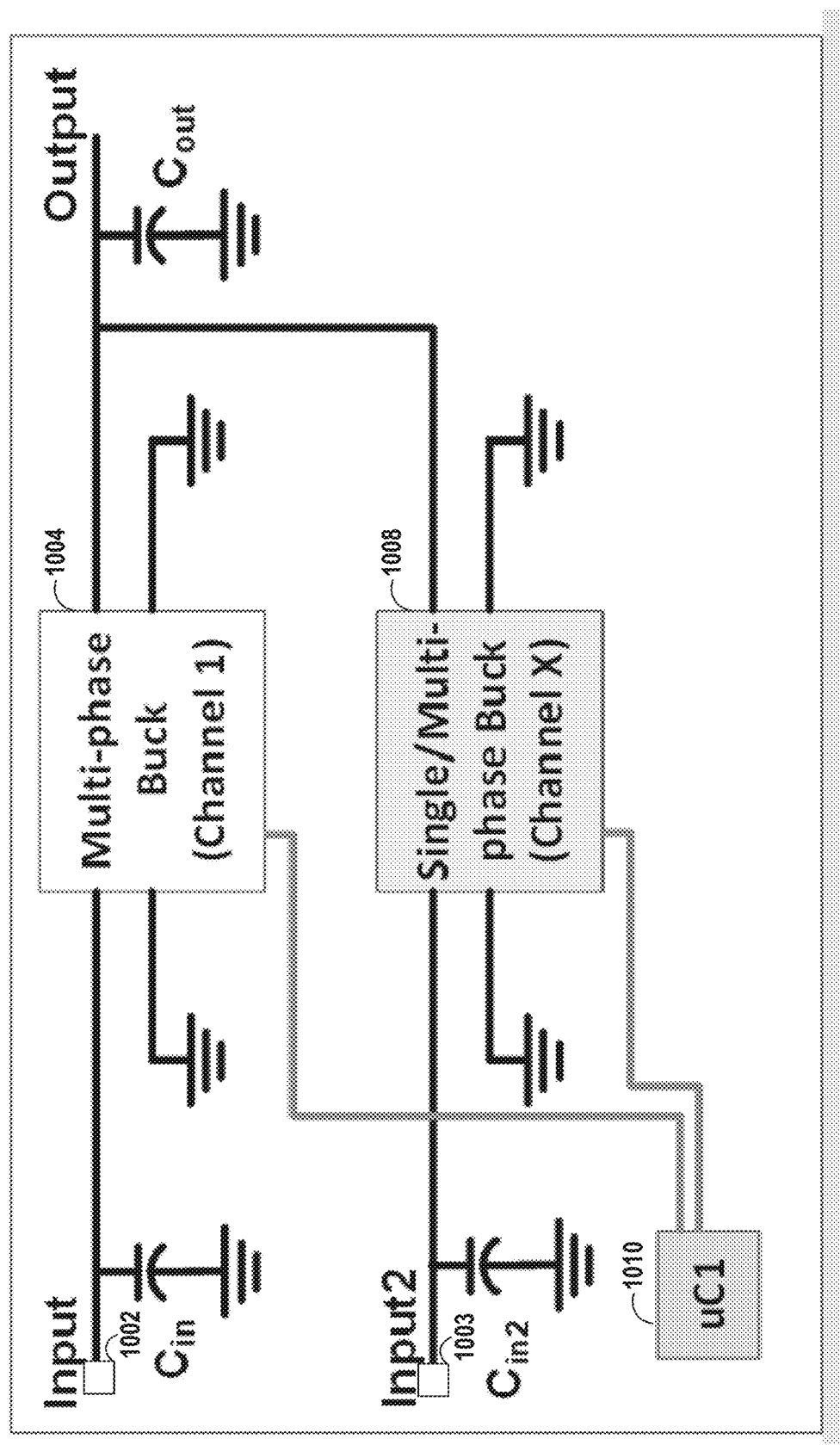
FIG. 10 is a conceptual diagram illustrating a second example SMPS, in accordance with one or more techniques of this disclosure.

FIG. 10 is a conceptual diagram illustrating a second example SMPS, in accordance with one or more techniques of this disclosure. FIG. 10 is discussed with reference to FIGS. 1-4, 5A-5B, 6A-6B, 7, 8, and 9 for example purposes only. FIG. 10 includes source 1002, phases 1004, auxiliary phase 1008, and microcontroller 1010, which may be examples of source 102, phases 104, auxiliary phase 108, and controller circuit 110, respectively. In the example of FIG. 10, phases 1004 and auxiliary phase 1008 are controlled by microprocessor 1010. In this example, source 1002 provides power to phases 1004. However, in the example of FIG. 10, source 1003 provides power to auxiliary phase 1008. Source 1003 may be different from source 1002. For example, source 1003 may output a different (e.g., higher, lower, etc.) voltage, current, or power than source 1002.

Figure 11:
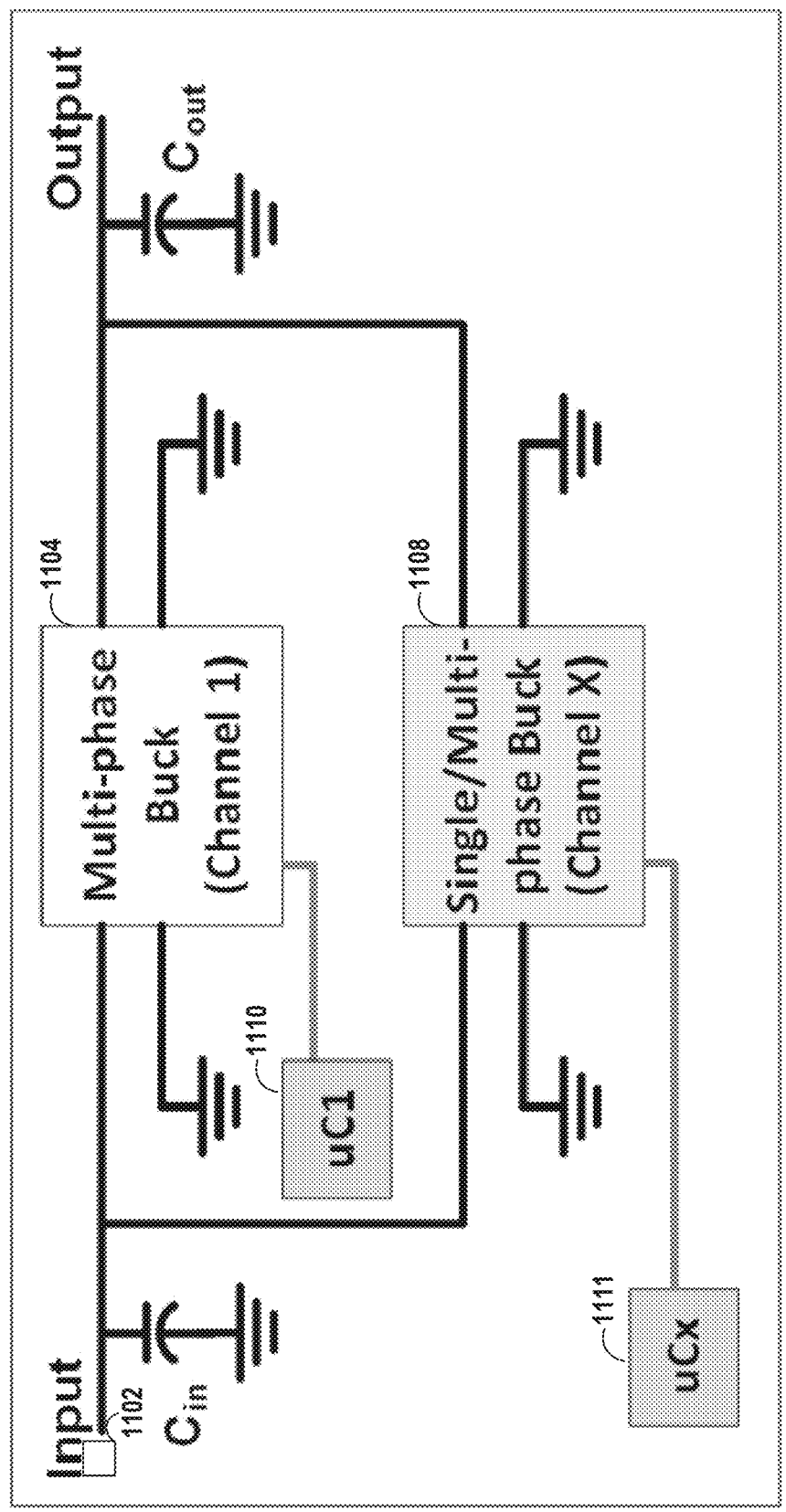
FIG. 11 is a conceptual diagram illustrating a third example SMPS, in accordance with one or more techniques of this disclosure.

FIG. 11 is a conceptual diagram illustrating a third example SMPS, in accordance with one or more techniques of this disclosure. FIG. 11 is discussed with reference to FIGS. 1-4, 5A-5B, 6A-6B, 7, 8, 9, and 10 for example purposes only. FIG. 11 includes source 1102, phases 1104, auxiliary phase 1108, and microcontroller 1110 (e.g., a microcontroller), which may be examples of source 102, phases 104, auxiliary phase 108, and controller circuit 110, respectively. In the example of FIG. 11, microcontroller 1110 controls phases 1104. However, in the example of FIG. 11, microcontroller 1111 controls auxiliary phase 1108. In this example, source 1102 provides power to phases 1104 and auxiliary phase 1108. For example, microcontroller 1110 and microcontroller 1111 may be formed on different integrated circuits (e.g., system on chip (SOC)).

Figure 12:
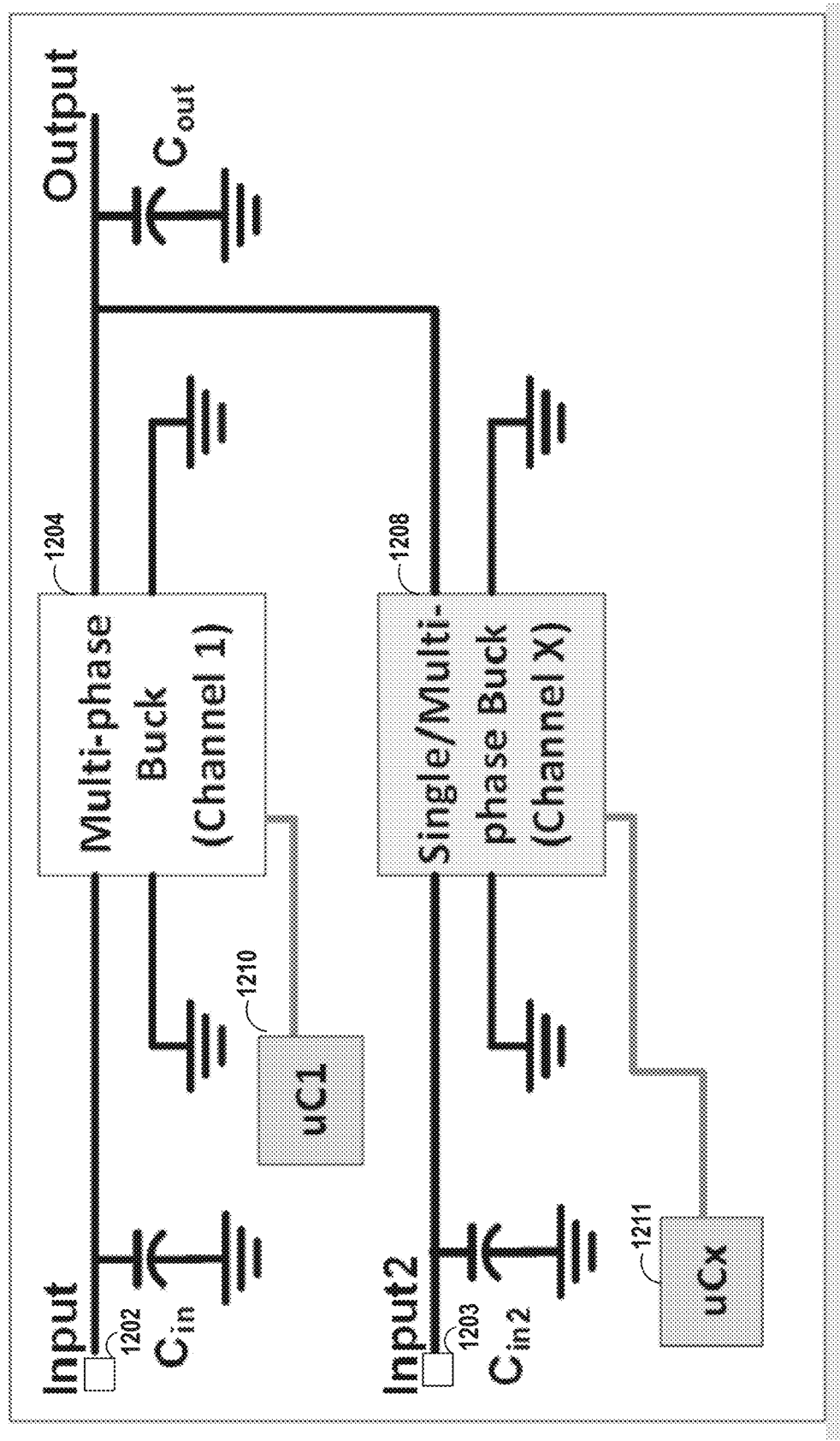
FIG. 12 is a conceptual diagram illustrating a fourth example SMPS, in accordance with one or more techniques of this disclosure.

FIG. 12 is a conceptual diagram illustrating a fourth example SMPS, in accordance with one or more techniques of this disclosure. FIG. 12 is discussed with reference to FIGS. 1-4, 5A-5B, 6A-6B, 7, 8, 9, 10, and 11 for example purposes only. FIG. 12 includes source 1202, phases 1204, auxiliary phase 1208, and microcontroller 1210, which may be examples of source 102, phases 104, auxiliary phase 108, and controller circuit 110, respectively. In the example of FIG. 12, microcontroller 1210 controls phases 1104. However, in the example of FIG. 12, microcontroller 1211 controls auxiliary phase 1208. For example, microcontroller 1210 and microcontroller 1211 may be formed on different integrated circuits (e.g., system on chip (SOC)). In this example, source 1202 provides power to phases 1204. However, in the example of FIG. 12, source 1203 provides power to auxiliary phase 1208. Source 1203 may be different from source 1202. For example, source 1203 may output a different (e.g., higher, lower, etc.) voltage, current, or power than source 1202.

The following examples may illustrate one or more aspects of the disclosure.

Example 1. A controller circuit for a switch-mode power supply (SMPS), the controller circuit being configured to: generate, with a plurality of phases, a combined output current at a supply node to supply a load; determine a ripple shaping current complimentary to an estimated ripple at the combined output current using a number of active phases of the plurality of phases that generate the combined output current; and generate, with an auxiliary phase, the ripple shaping current at the supply node to reduce ripple occurring at the combined output current.

Example 2. The controller circuit of example 1, wherein, to determine the ripple shaping current, the controller circuit is configured to: determine the ripple shaping current using a phase inductance of the plurality of phases.

Example 3. The controller circuit of any combination of examples 1-2, wherein, to determine the ripple shaping current, the controller circuit is configured to: determine a timing signal using a time period of a single phase of the plurality of phases, a maximum number of active phases of the plurality of phases, and a duty cycle.

Example 4. The controller circuit of any combination of examples 1-3, wherein, to determine the timing signal, the controller circuit is configured to: generate a rising edge clock using the time period and the maximum number of active phases; generate a falling edge clock using the time period, the maximum number of active phases, and the duty cycle; and generate the timing signal using the rising edge clock and the falling edge clock such that the timing signal indicates when the combined output current is rising and when the combined output current is falling.

Example 5. The controller circuit of any combination of examples 1-4, wherein the controller circuit comprises: an adder configured to: receive, for each respective phase of the plurality of phases, a gate signal for activating the respective phase to a respective input of a plurality of inputs of the adder; and output an indication of the number of active phases; and a counter configured to: receive the rising edge clock at a set input of the counter; receive the frilling edge clock at a reset input of the counter; and output the timing signal.

Example 6. The controller circuit of any combination of examples 1-5, wherein, to determine the ripple shaping current, the controller circuit is configured to: generate a center value using the number of active phases; and generate a band of center values using the center value, wherein, to generate the ripple shaping current, the controller circuit is configured to generate the ripple shaping current to be within the hand of center values.

Example 7. The controller circuit of any combination of examples 1-6, wherein, to generate the center value, the controller circuit is configured to, in response to determining a timing signal indicates the combined output current is falling: determine a first system factor by subtracting an output voltage of the plurality of phases by a result of multiplying an input voltage of the plurality of phases by an efficiency of the plurality of phases; determine a second system factor as the output voltage of the plurality of phases; divide a result of multiplying the first system factor by the number of active phases and a falling edge clock by a phase inductance to determine a first falling current factor; divide a result of multiplying the second system factor by a number of inactive phases of the plurality of phases and the falling edge clock by the phase inductance to determine a second falling current factor; and add the first falling current factor and the second falling current factor.

Example 8. The controller circuit of any combination of examples 1-7, wherein, to generate the center value, the controller circuit is configured to, in response to determining a timing signal indicates the combined output current is rising: determine a first system factor by subtracting an output voltage of the SMPS by a result of multiplying an input voltage of the SMPS by an efficiency of the SMPS; determine a second system factor as the output voltage of the SMPS; divide a result of multiplying the first system factor by the number of active phases and a rising edge clock by the phase inductance to determine a first rising current factor; divide a result of multiplying the second system factor by the number of inactive phases and the rising edge clock by the phase inductance to determine a second rising current factor; and add the first rising current factor and the second rising current factor.

Example 9. The controller circuit of any combination of examples 1-8, wherein, to generate the band of center values, the controller circuit is configured to: add a band size offset to the center value to generate an upper limit; and subtract the band size offset from the center value to generate a lower limit, wherein, to generate the ripple shaping current to be within the band of center values, the controller circuit is configured to operate in a rising current state that increases the ripple shaping current or a falling current state that increases the ripple shaping current, wherein the controller circuit is configured to transition from the rising current state to the falling current state when a measurement of the ripple shaping current generated indicates the ripple shaping current is not less than the upper limit and transition from the falling current state to the rising current state when the measurement of the ripple shaping current generated indicates the ripple shaping current is not greater than the lower limit.

Example 10. The controller circuit of any combination of examples 1-9, wherein, to generate the combined output current, the controller circuit is configured to generate the combined output current using a first switching frequency; and wherein, to generate the ripple shaping current, the controller circuit is configured to generate the ripple shaping current using a second switching frequency that is greater than the first switching frequency.

Example 11. A method for controlling a switch-mode power supply (SMPS), the method comprising: generating, by controller circuitry, with a plurality of phases, a combined output current at a supply node to supply a load; determining, by the controller circuitry, a ripple shaping current complimentary to an estimated ripple at the combined output current using a number of active phases of the plurality of phases that generate the combined output current; and generating, by the controller circuitry, with an auxiliary phase, the ripple shaping current at the supply node to reduce ripple occurring at the combined output current.

Example 12. The method of example 11, wherein determining the ripple shaping current comprises: determining the ripple shaping current using a phase inductance of the plurality of phases.

Example 13. The method of any combination of examples 11-12, wherein determining the ripple shaping current comprises: determining a timing signal using a time period of a single phase of the plurality of phases, a maximum number of active phases of the plurality of phases, and a duty cycle.

Example 14. The method of any combination of examples 11-13, wherein determining the timing signal comprises: generating a rising edge clock using the time period and the maximum number of active phases; generating a falling edge clock using the time period, the maximum number of active phases, and the duty cycle; and generating the timing signal using the rising edge clock and the falling edge clock such that the timing signal indicates when the combined output current is rising and when the combined output current is falling.

Example 15. The method of any combination of examples 11-14, wherein determining the ripple shaping current comprises: generating a center value using the number of active phases; and generating a band of center values using the center value; and wherein generating the ripple shaping current comprises generating the ripple shaping current to be within the band of center values.

Example 16. The method of any combination of examples 11-15, wherein generating the center value comprises, in response to determining a timing signal indicates the combined output current is falling: determining a first system factor by subtracting an output voltage of the plurality of phases by a result of multiplying an input voltage of the plurality of phases by an efficiency of the plurality of phases; determining a second system factor as the output voltage of the plurality of phases; dividing a result of multiplying the first system factor by the number of active phases and a falling edge clock by a phase inductance to determine a first falling current factor; dividing a result of multiplying the second system factor by a number of inactive phases of the plurality of phases and the falling edge clock by the phase inductance to determine a second falling current factor; and adding the first falling current factor and the second falling current factor.

Example 17. The method of any combination of examples 11-16, wherein generating the center value comprises, in response to determining a timing signal indicates the combined output current is rising: determining a first system factor by subtracting an output voltage of the plurality of phases by a result of multiplying an input voltage of the plurality of phases by an efficiency of the plurality of phases; determining a second system factor as the output voltage of the plurality of phases; dividing a result of multiplying the first system factor by the number of active phases and a rising edge clock by the phase inductance to determine a first rising current factor; dividing a result of multiplying the second system factor by the number of inactive phases and the rising edge clock by the phase inductance to determine a second rising current factor; and adding the first rising current factor and the second rising current factor.

Example 18. The method of any combination of examples 11-17, wherein generating the band of center values comprises: adding a band size offset to the center value to generate an upper limit; and subtracting the hand size offset from the center value to generate a lower limit; and wherein generating the ripple shaping current to be within the band of center values comprises operating in a rising current state that increases the ripple shaping current or a falling current state that increases the ripple shaping current, wherein the controller circuit transitions from the rising current state to the falling current state when a measurement of the ripple shaping current generated indicates the ripple shaping current is not less than the upper limit and transitions from the falling current state to the rising current state when the measurement of the ripple shaping current generated indicates the ripple shaping current is not greater than the lower limit.

Example 19. The method of any combination of examples 11-18, wherein generating the combined output current comprises generating the combined output current using a first switching frequency; and wherein generating the ripple shaping current comprises generating the ripple shaping current using a second switching frequency that is greater than the first switching frequency.

Example 20. A switch-mode power supply (SMPS) system comprising: a plurality of phases configured to supply a load; a supply node; a capacitor coupled to the supply node; an auxiliary phase configured to reduce ripple occurring at the combined output current; and a controller circuit configured to: generate, with the plurality of phases, a combined output current at the supply node to supply the load; determine a ripple shaping current complimentary to an estimated ripple at the combined output current using a number of active phases of the plurality of phases that generate the combined output current; and generate, with the auxiliary phase, the ripple shaping current at the supply node to reduce ripple occurring at the combined output current.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various aspects have been described in this disclosure. These and other aspects are within the scope of the following claims.

The invention claimed is:

1. A controller circuit for a switch-mode power supply (SMPS), the controller circuit being configured to:
   generate, with a plurality of phases, a combined output current at a supply node to supply a load;
   determine a ripple shaping current complimentary to an estimated ripple at the combined output current using a number of active phases of the plurality of phases that generate the combined output current, wherein, to determine the ripple shaping current, the controller circuit is configured to generate a center value using the number of active phases and generate a band of center values using the center value; and
   generate, with an auxiliary phase, the ripple shaping current at the supply node to reduce ripple occurring at the combined output current, wherein, to generate the ripple shaping current, the controller circuit is configured to generate the ripple shaping current to be within the band of center values.

2. The controller circuit of claim 1, wherein, to generate the center value, the controller circuit is configured to, in response to determining a timing signal indicates the combined output current is falling:
   determine a first system factor by subtracting an output voltage of the plurality of phases by a result of multiplying an input voltage of the plurality of phases by an efficiency of the plurality of phases;
   determine a second system factor as the output voltage of the plurality of phases;
   divide a result of multiplying the first system factor by the number of active phases and a falling edge clock by a phase inductance to determine a first falling current factor;
   divide a result of multiplying the second system factor by a number of inactive phases of the plurality of phases and the falling edge clock by the phase inductance to determine a second falling current factor; and
   add the first falling current factor and the second falling current factor.

3. The controller circuit of claim 1, wherein, to generate the center value, the controller circuit is configured to, in response to determining a timing signal indicates the combined output current is rising:
   determine a first system factor by subtracting an output voltage of the SMPS by a result of multiplying an input voltage of the SMPS by an efficiency of the SMPS;
   determine a second system factor as the output voltage of the SMPS;
   divide a result of multiplying the first system factor by the number of active phases and a rising edge clock by the phase inductance to determine a first rising current factor;
   divide a result of multiplying the second system factor by the number of inactive phases and the rising edge clock by the phase inductance to determine a second rising current factor; and
   add the first rising current factor and the second rising current factor.

4. The controller circuit of claim 1, wherein, to generate the band of center values, the controller circuit is configured to:
   add a band size offset to the center value to generate an upper limit; and
   subtract the band size offset from the center value to generate a lower limit, wherein, to generate the ripple shaping current to be within the band of center values, the controller circuit is configured to operate in a rising current state that increases the ripple shaping current or a falling current state that increases the ripple shaping current,
   wherein the controller circuit is configured to transition from the rising current state to the falling current state when a measurement of the ripple shaping current generated indicates the ripple shaping current is not less than the upper limit and transition from the falling current state to the rising current state when the measurement of the ripple shaping current generated indicates the ripple shaping current is not greater than the lower limit.

5. The controller circuit of claim 1,
   wherein, to generate the combined output current, the controller circuit is configured to generate the combined output current using a first switching frequency; and
   wherein, to generate the ripple shaping current, the controller circuit is configured to generate the ripple shaping current using a second switching frequency that is greater than the first switching frequency.

6. A method for controlling a switch-mode power supply (SMPS), the method comprising:
   generating, by controller circuitry, with a plurality of phases, a combined output current at a supply node to supply a load;
   determining, by the controller circuitry, a ripple shaping current complimentary to an estimated ripple at the combined output current using a number of active phases of the plurality of phases that generate the combined output current, wherein determining the ripple shaping current comprises generating a center value using the number of active phases and generating a band of center values using the center value; and
   generating, by the controller circuitry, with an auxiliary phase, the ripple shaping current at the supply node to reduce ripple occurring at the combined output current, wherein generating the ripple shaping current comprises generating the ripple shaping current to be within the band of center values.

7. The method of claim 6, wherein generating the center value comprises, in response to determining a timing signal indicates the combined output current is falling:
  determining a first system factor by subtracting an output voltage of the plurality of phases by a result of multiplying an input voltage of the plurality of phases by an efficiency of the plurality of phases;
  determining a second system factor as the output voltage of the plurality of phases;
  dividing a result of multiplying the first system factor by the number of active phases and a falling edge clock by a phase inductance to determine a first falling current factor;
  dividing a result of multiplying the second system factor by a number of inactive phases of the plurality of phases and the falling edge clock by the phase inductance to determine a second falling current factor; and
  adding the first falling current factor and the second falling current factor.

8. The method of claim 6, wherein generating the center value comprises, in response to determining a timing signal indicates the combined output current is rising:
  determining a first system factor by subtracting an output voltage of the plurality of phases by a result of multiplying an input voltage of the plurality of phases by an efficiency of the plurality of phases;
  determining a second system factor as the output voltage of the plurality of phases;
  dividing a result of multiplying the first system factor by the number of active phases and a rising edge clock by the phase inductance to determine a first rising current factor;
  dividing a result of multiplying the second system factor by the number of inactive phases and the rising edge clock by the phase inductance to determine a second rising current factor; and
  adding the first rising current factor and the second rising current factor.

9. The method of claim 6,
  wherein generating the band of center values comprises:
    adding a band size offset to the center value to generate an upper limit; and
    subtracting the band size offset from the center value to generate a lower limit; and
  wherein generating the ripple shaping current to be within the band of center values comprises operating in a rising current state that increases the ripple shaping current or a falling current state that increases the ripple shaping current, wherein the controller circuit transitions from the rising current state to the falling current state when a measurement of the ripple shaping current generated indicates the ripple shaping current is not less than the upper limit and transitions from the falling current state to the rising current state when the measurement of the ripple shaping current generated indicates the ripple shaping current is not greater than the lower limit.

10. The method of claim 6,
  wherein generating the combined output current comprises generating the combined output current using a first switching frequency; and
  wherein generating the ripple shaping current comprises generating the ripple shaping current using a second switching frequency that is greater than the first switching frequency.

11. A switch-mode power supply (SMPS) system comprising:
  a plurality of phases configured to supply a load;
  a supply node;
  a capacitor coupled to the supply node;
  an auxiliary phase configured to reduce ripple occurring at the combined output current; and
  a controller circuit configured to:
    generate, with the plurality of phases, a combined output current at the supply node to supply the load;
    determine a ripple shaping current complimentary to an estimated ripple at the combined output current using a number of active phases of the plurality of phases that generate the combined output current, wherein, to determine the ripple shaping current, the controller circuit is configured to generate a center value using the number of active phases and generate a band of center values using the center value; and
    generate, with the auxiliary phase, the ripple shaping current at the supply node to reduce ripple occurring at the combined output current, wherein, to generate the ripple shaping current, the controller circuit is configured to generate the ripple shaping current to be within the band of center values.

* * * * *